UNITED STATES PATENT OFFICE.

ELIAS HEINRICH LEOPOLD OSTERMANN, OF HAMBURG, GERMANY.

METHOD OF PRESERVING FOODS.

SPECIFICATION forming part of Letters Patent No. 575,978, dated January 26, 1897.

Application filed June 1, 1896. Serial No. 593,911. (No specimens.)

*To all whom it may concern:*

Be it known that I, ELIAS HEINRICH LEOPOLD OSTERMANN, a subject of the Emperor of Germany, residing at Hamburg, Germany, have invented new and useful Improvements in the Preservation of Organic Substances, of which the following is a specification.

The materials hitherto employed for preserving organic substances, such as salt, smoke, alcohol, vinegar, and the like, had to be used in very large quantities compared with that of the substance to be preserved in order to insure efficiency. I have discovered that oxyquinolin and combinations, chemical and others, of oxyquinolin, as well as combinations of its salts, such as, for instance, the product (chinosol) obtained by the process described in the Patent No. 563,116, dated June 30, 1896, have a preserving quality of extraordinary power. The said substances prevent the development of microbes much better than any hitherto employed, such, for instance, as boric acid, sulfite of soda, salicylic acid, and the like, and are, as the chinosol, for instance, not poisonous, free from injurious smells, not volatile, a combination of advantages which cannot be claimed for other known strong antiseptics. Experiments have shown that these substances insure a surprising success, even if used in extremely small quantities, so small that they neither perceptibly influence the taste nor are injurious to health. In order that the invention may be more fully understood, the following examples are given.

An animal, say a rabbit, just slaughtered, whose head has been severed, can be sprinkled with a powder consisting of, say, two parts chinosol and fifty parts fine fossil meal. This powder is preferably rubbed uniformly over the animal and prevents the body from becoming foul. It is sufficient to use one gram of such powder, therefore only 0.04 grams of chinosol. The same result is obtained by washing the body with a diluted chinosol solution. A piece of meat dipped into diluted chinosol solution will dry without becoming foul. A piece of meat washed in diluted chinosol solution can be kept a long time in a closed vessel without getting foul. The meat can be also preserved by covering it with a solution of gelatin or similar substance to which a little chinosol has been added; also meat partly covered by skin can be preserved by covering it on its raw side with a solution or powder of chinosol.

Game may be preserved by washing the hole made by the shot as soon as possible, and after removal of the intestines washing all parts of the body not covered by skin with a solution of chinosol.

Eggs may be covered with a solution of chinosol. Solutions of sugar, gum-arabic, glue, &c., as also liquids, such as beer, water, and others, can be preserved by adding to them from one in ten thousand to one in one hundred thousand chinosol or other soluble oxyquinolin combinations. Oil-seeds and similar objects when stored are preserved from becoming heated and spoiled by adding to them a small quantity of fossil meal saturated with chinosol.

Fruits, meat, and the like are preserved by embedding them in an indifferent powder, such as, for instance, fossil meal, to which chinosol has been added. The most widely-different organic substances and liquids can be preserved, as, for instance, wax, by adding to it some oxyquinolin combination; also serum, solutions of pepsin, white of eggs, fats, greases, the remains of fish, and other articles can be preserved by adding watery and other solutions, the skins by covering them with a solution or by rubbing in some substance containing oxyquinolin. I wish it to be understood that I do not confine myself to the precise proportions set forth.

Having now particularly described and ascertained the nature of my invention and in what manner the same is to be performed, I declare that what I claim is—

1. The method of preserving food and other organic substances which consists in applying to the surface of said substance a compound containing oxyquinolin dissolved in gelatin, substantially as described.

2. The method of preserving food and other organic substances which consists in applying to the substance a solution of gelatin and an innocuous salt of oxyquinolin, substantially as described.

In testimony whereof I have signed my name to this specification in the presence of two subscribing witnesses.

ELIAS HEINRICH LEOPOLD OSTERMANN.

Witnesses:
JOSEF SUTER,
E. H. L. MUMMENHOFF.